United States Patent
Wu et al.

(10) Patent No.: US 11,321,639 B1
(45) Date of Patent: May 3, 2022

(54) AUTOMATED EVALUATION OF ACTING PERFORMANCE USING CLOUD SERVICES

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

(*) Notice: Subject to any disclaimer, the term of this patent is extended or adjusted under 35 U.S.C. 154(b) by 0 days.

(21) Appl. No.: 17/549,749

(22) Filed: Dec. 13, 2021

(51) Int. Cl.
| | |
|---|---|
| G06F 17/00 | (2019.01) |
| G06N 20/00 | (2019.01) |
| G06V 40/16 | (2022.01) |
| G10L 21/10 | (2013.01) |
| G06V 10/74 | (2022.01) |
| G10L 21/0208 | (2013.01) |
| G06V 20/40 | (2022.01) |

(52) U.S. Cl.
CPC ........... *G06N 20/00* (2019.01); *G06V 10/761* (2022.01); *G06V 20/40* (2022.01); *G06V 40/174* (2022.01); *G10L 21/0208* (2013.01); *G10L 21/10* (2013.01)

(58) Field of Classification Search
CPC ...... G06N 20/00; G06V 10/761; G06V 20/40; G06V 40/174; G10L 21/0208; G10L 21/10
USPC .......................................................... 706/11
See application file for complete search history.

(56) References Cited

U.S. PATENT DOCUMENTS

| | | |
|---|---|---|
| 6,466,655 B1 | 10/2002 | Clark |
| 8,910,201 B1 | 12/2014 | Zamiska et al. |
| 9,106,812 B1 | 8/2015 | Price et al. |
| 10,721,377 B1 | 7/2020 | Wu et al. |
| 11,070,888 B1 | 7/2021 | Wu et al. |
| 11,107,503 B2 | 8/2021 | Wu et al. |
| 11,166,086 B1 | 11/2021 | Wu et al. |

(Continued)

FOREIGN PATENT DOCUMENTS

| | | |
|---|---|---|
| CA | 3038767 | 10/2019 |
| CN | 101316362 A | 12/2008 |

(Continued)

OTHER PUBLICATIONS

International Search Report and Written Opinion dated Mar. 10, 2020 in International Application No. PCT/CN2019/090722, 10 pages.

(Continued)

*Primary Examiner* — Charlotte M Baker
(74) *Attorney, Agent, or Firm* — Perkins Coie LLP

(57) ABSTRACT

Methods, apparatus and systems related to automated evaluation of acting performance are disclosed. In one example aspect, a system for an automated evaluation of performance activities includes a user interface configured to allow a user to create a customized automated evaluation service. The user can select a subset of machine learning engines from one or more available machine learning engines to create such service. The user interface is further configured to receive a set of input data of a performance performed by a performer. The system includes the one or more available machine learning engines each configured to generate a sub-score in a specific area using the set of input data received from the user interface. The system also includes an aggregator configured to produce an output indicating a quality of the performance.

28 Claims, 11 Drawing Sheets

(56) References Cited

U.S. PATENT DOCUMENTS

| | | |
|---|---|---|
| 2002/0099577 A1 | 7/2002 | Black |
| 2003/0061610 A1 | 3/2003 | Errico |
| 2006/0053041 A1 | 3/2006 | Sakai |
| 2006/0251382 A1 | 11/2006 | Vronay et al. |
| 2006/0282783 A1 | 12/2006 | Covell et al. |
| 2006/0282785 A1 | 12/2006 | McCarthy et al. |
| 2008/0010601 A1 | 1/2008 | Dachs |
| 2008/0028318 A1 | 1/2008 | Shikuma |
| 2008/0033801 A1 | 2/2008 | McKenna et al. |
| 2008/0036917 A1 | 2/2008 | Pascarella et al. |
| 2008/0101476 A1 | 5/2008 | Tian et al. |
| 2009/0063659 A1 | 3/2009 | Kazerouni et al. |
| 2011/0085025 A1 | 4/2011 | Pace et al. |
| 2011/0162002 A1 | 6/2011 | Jones et al. |
| 2011/0206351 A1 | 8/2011 | Givoly |
| 2011/0249953 A1 | 10/2011 | Suri et al. |
| 2012/0294589 A1 | 11/2012 | Samra et al. |
| 2013/0067333 A1 | 3/2013 | Brenneman |
| 2013/0124984 A1 | 5/2013 | Kuspa |
| 2013/0151970 A1 | 6/2013 | Achour |
| 2013/0166625 A1 | 6/2013 | Swaminathan et al. |
| 2013/0232178 A1 | 9/2013 | Katsambas |
| 2013/0290557 A1 | 10/2013 | Baratz |
| 2014/0082079 A1 | 3/2014 | Dunsmuir |
| 2014/0119428 A1 | 5/2014 | Catchpole et al. |
| 2014/0132841 A1 | 5/2014 | Beaulieu-Jones et al. |
| 2014/0133834 A1 | 5/2014 | Shannon |
| 2014/0328570 A1 | 11/2014 | Cheng et al. |
| 2015/0012325 A1 | 1/2015 | Maher |
| 2015/0043892 A1 | 2/2015 | Groman |
| 2015/0082349 A1 | 3/2015 | Ishtiaq et al. |
| 2015/0256858 A1 | 9/2015 | Xue |
| 2015/0261403 A1 | 9/2015 | Greenberg et al. |
| 2015/0281710 A1 | 10/2015 | Sievert et al. |
| 2015/0302893 A1 | 10/2015 | Shannon |
| 2015/0363718 A1 | 12/2015 | Boss et al. |
| 2015/0379358 A1 | 12/2015 | Renkis |
| 2016/0027198 A1 | 1/2016 | Terry et al. |
| 2016/0050465 A1 | 2/2016 | Zaheer et al. |
| 2016/0132546 A1 | 5/2016 | Keating |
| 2016/0292509 A1 | 10/2016 | Kaps et al. |
| 2016/0323483 A1 | 11/2016 | Brown |
| 2017/0017644 A1 | 1/2017 | Accardo et al. |
| 2017/0048492 A1 | 2/2017 | Buford et al. |
| 2017/0169853 A1 | 6/2017 | Hu et al. |
| 2017/0178346 A1 | 6/2017 | Ferro et al. |
| 2017/0337912 A1 | 11/2017 | Caligor et al. |
| 2017/0358023 A1 | 12/2017 | Peterson |
| 2018/0005037 A1 | 1/2018 | Smith et al. |
| 2018/0213289 A1 | 7/2018 | Lee et al. |
| 2019/0045194 A1 | 2/2019 | Zavesky et al. |
| 2019/0058845 A1 | 2/2019 | MacDonald-King et al. |
| 2019/0155829 A1 | 5/2019 | Schriber et al. |
| 2019/0215540 A1 | 7/2019 | Nicol et al. |
| 2019/0356948 A1 | 11/2019 | Stojancic et al. |
| 2020/0081596 A1 | 3/2020 | Greenberg et al. |
| 2020/0168186 A1* | 5/2020 | Yamamoto ............... G10H 1/00 |
| 2020/0312368 A1 | 10/2020 | Waterman |
| 2020/0396357 A1 | 12/2020 | Wu et al. |
| 2021/0011960 A1 | 1/2021 | Chambon-Cartier |
| 2021/0084085 A1 | 3/2021 | Jones et al. |
| 2021/0104260 A1 | 4/2021 | Wu et al. |
| 2021/0185222 A1 | 6/2021 | Zavesky et al. |
| 2021/0211779 A1 | 7/2021 | Wu et al. |

FOREIGN PATENT DOCUMENTS

| | | |
|---|---|---|
| CN | 101365094 | 2/2009 |
| CN | 101960440 | 1/2011 |
| CN | 104581222 | 4/2015 |
| CN | 108447129 A | 8/2018 |
| CN | 109196371 | 1/2019 |
| CN | 109905732 | 6/2019 |
| JP | 2000101647 A | 4/2000 |
| WO | 2004105035 A1 | 12/2004 |
| WO | 2008156558 A1 | 12/2008 |
| WO | 2010068175 A2 | 6/2010 |

OTHER PUBLICATIONS

Davenport, Glorianna, et al., "Cinematic primitives for multimedia", MIT Media Laboratory, IEEE Computer graphics and Applications, pp. 67-74, Jul. 1991.

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

P. Minardi and B. Alonso, "How Automation Can Help Broadcasters and Production Companies Reach Video Production Nirvana," SMPTE17: Embracing Connective Media, 2015, pp. 1-12, doi: 10.5594/M001738. (Year: 2015).

USPTO Non-Final Office Action for U.S. Appl. No. 17/209,044, dated Jan. 6, 2022 (34 pages).

International Search Report and Written Opinion dated Jan. 3, 2022 for International Application No. PCT/US2021/047407, filed on Aug. 24, 2021 (20 pages).

International Search Report and Written Opinion dated Feb. 28, 2022 for International Application No. PCT/US2021/056839, filed on Oct. 27, 2021 (16 pages).

Hua et al., "AVE—Automated Home Video Editing," Proceedings of the 11th ACM International Conference on Multimedia, MM '03, Berkeley, CA, Nov. 2-8, 2003.

\* cited by examiner

AUTOMATED EVALUATION OF ACTING PERFORMANCE USING CLOUD SERVICES

TECHNICAL FIELD

This patent document relates to automated evaluation of acting performance that includes audios, videos, or other types of multimedia contents.

BACKGROUND

Good performing art professionals share certain characteristics whether they work in film, television, theater or other multimedia production with performances by persons or performing art professionals—they have the skills to portray their roles convincingly and connect with audiences by representing or conveying emotions, motivations, and intentions of a character through manifestation of expressions by eyes, facial expressions, voice and speech expressions and physical gesture or movements of the body. Evaluation of the acting performance, however, tends to be highly subjective and may require significant amount of time and effort by the trained professionals.

SUMMARY

Described herein are techniques, subsystems and systems to facilitate automated evaluation of acting performance, particularly for amateur performances. The disclosed techniques can be used to facilitate quick evaluation of performances in mass audition processes and/or acting competitions. The evaluation can focus on the objective criteria to quickly filter out performances that fail to meet the standard for the auditions and/or competitions.

In one example aspect, the disclosed technology can be implemented to provide a system for an automated evaluation of performance activities. This system includes a user interface configured to allow a user to create a customized automated evaluation service. The user can select a subset of machine learning engines from one or more available machine learning engines to create such service. The user interface is further configured to receive a set of input data of a performance performed by a performer, the set of input data comprising at least video performance data or audio performance data. The system includes the one or more available machine learning engines each configured to generate a sub-score in a specific area using the set of input data received from the user interface. The system also includes an aggregator configured to produce an output indicating a quality of the performance by aggregating the sub-scores generated by the subset of the one or more available machine learning engines. In some implementations, for example, the aggregator can be in communication with the one or more machine learning engines to receive sub-scores generated by the one or more available machine learning engines, assign weighting factors to the sub-scores, respectively, based on the one or more characteristics of the performance, and aggregate the sub-scores using the weighting factors to produce an output indicating a quality of the performance activity.

In another example aspect, the disclosed technology can be implemented to provide a non-transitory computer program product having code stored thereon is disclosed. The code (e.g., software program), when executed by one or more processors in communication with each other via a network, can cause the one or more processors to receive a set of input data of a performance activity performed by a performer, wherein the set of input data comprises at least video performance data or audio performance data, determine one or more characteristics of the performance activity based on the at least video performance data or audio performance data, and build a customized evaluation service using a set of machine learning engines selected from one or more machine learning engines available in an evaluation system of performance activities. The set of machine learning engines is selected based on the one or more characteristics of the performance activity. Each of a set of machine learning engines determines a sub-score for the performance activity, and an output is generated to indicate a quality of the performance activity by aggregating sub-scores determined by the set of machine learning engines.

In yet another example aspect, the disclosed technology can be implemented to provide a method for automatically evaluating a performance activity performed by a performer. This method includes receiving, via a user interface, a set of input data of the performance activity, wherein the set of input data comprises at least video performance data or audio performance data, wherein part of the at least video performance data or audio performance data represents a reference activity corresponding to the performance activity; and constructing a customized evaluation service using a set of machine learning engines selected from one or more available machine learning engines, wherein the set of machine learning engines is selected based on one or more characteristics of the performance activity. The constructing includes generating, using at least one of the set of machine learning engines, a machine-readable script based on the audio and/or video data of the reference activity, wherein the machine-readable script includes at least one or more lines spoken and/or one or more actions performed during the reference activity, each of the one or more lines or the one or more actions is associated with a timestamp included in the machine-readable script. This method produces an output indicating a quality of the performance activity by comparing the performance activity with the reference activity using the machine-readable script.

These, and other, aspects of the disclosed technology are described in greater detail in the present document.

DETAILED DESCRIPTION

Television programs have taken on different forms nowadays. For example, variety shows that include a variety of acts such as musical performances, sketch comedy, magic, acrobatics, juggling, and/or ventriloquism are widespread in some parts of the world. Reality shows and various real-time competitions have also gained popularity amongst viewers. Some of the programs feature acting competitions, in which candidates are asked to provide acting performance and are evaluated in real-time to determine who is a better actor or actress. In these programs, providing a standardized baseline for the evaluation can be difficult as artistic evaluation are often highly subjective. Some of the programs require mass auditions to select the proper cast. Quickly filtering out candidates that do not match the profiles of the roles can be challenging and often require tremendous amount of time and professional experience.

This patent document discloses techniques that can be implemented in various embodiments to provide an automated platform for evaluating performance activities using objective criteria. The results provided by the platform can used as a baseline in real-time acting competitions, mass auditions, as well as other types of vocal and/or performing activities (public speech, gymnastics, and/or ice skating). For example, the platform can facilitate the evaluation process in mass audition by quickly ruling out candidates who do not meet the minimum requirements of the roles based on features such as articulation, body motions or facial expressions. The disclosed techniques can also be used in combination with subjective evaluation of the performances to iteratively select candidate performers in mass auditions and/or live acting competitions.

In some embodiments, the automated platform can be implemented as a cloud service that provides one or more modularly designed engines/sub-services to allow the users to customize the types of evaluations needed according to the genre or characteristics of the contents. The disclosed platform enables fully automated evaluation for recorded performances and is capable of processing a large amount of audio and video input data without imposing any burden on the professional crew.

Overview of the System

Figure 1:
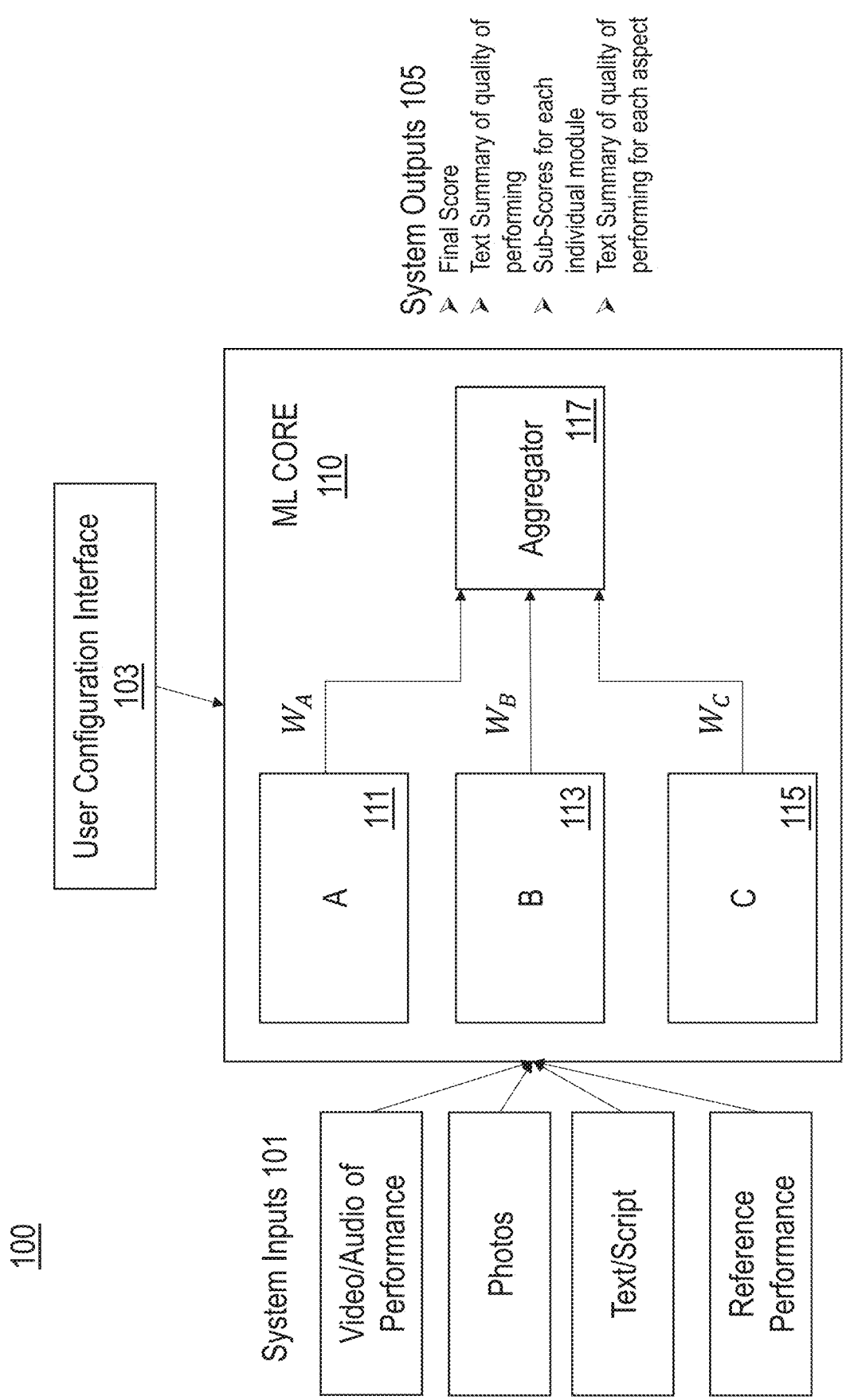
FIG. 1 illustrates a schematic diagram of an example automated acting performance evaluation system in accordance with the one or more embodiments of the present technology.

FIG. 1 illustrates a schematic diagram of an example automated acting performance evaluation system 100 in accordance with the one or more embodiments of the present technology. The system 100 includes a Machine Learning (ML) system 110 that receives various types of system inputs 101 associated with a performance by an actor. The ML system 110 includes a number of ML grading processing engines 111, 113, 115, etc. for evaluating the performance. Each ML grading processing engine can be designed to evaluate one specific aspect of acting/performing based on the system inputs 101. The system 100 provides a user configuration interface 103 to allow users to select available ML grading processing engines for evaluating specific performances or to create a customized evaluation service by assembling a selected number of ML grading processing engines in the system 100. The system 100 then generates outputs 105 that indicate the grading of the performance. In the example shown in FIG. 1, the grading outputs from the ML grading processing engines on various aspects of the performance under evaluation can be fed into a grading aggregator engine 117 that produces a final grade or score of the performance based on the received grading outputs from the ML grading processing engines.

System Inputs

Different types of system inputs 101 can be provided for different types of acting tasks (e.g., drama acting, speech, singing, dancing, etc.). The inputs 101 can include at least one or more of the following:

1. Video/audio recordings. The candidate can provide recordings of the performances that often include both video and audio data.

2. Photos. The candidate can provide photos showing different facial expressions associated with different emotions (e.g., sad, happy, angry, calm, etc.). The photos can be taken at different angles to achieve a complete capture of the facial expressions, thereby providing a reference for the system to determine corresponding expressions that appear in the video recordings.

3. Textual descriptions of the performance. In some embodiments, a machine-readable script that includes lines recited or acted out by the performer(s) and other aspects of the performances (e.g., mood, body motions/gestures) can be provided to the system. In some embodiments, a conventional script of the performance can be fed into the system.

4. Reference video/audio data. In some embodiments, video and audio materials of a prior performance by the candidate (e.g., a recording of a live acting competition or a scene from a past performance on stage, TV, or movie) can be provided as a reference performance to be analyzed as part of the evaluation by the system in FIG. 1. For example, video and audio data of a reference clip can be provided as a baseline for the evaluation.

Modular Architecture of the ML Core

As shown in FIG. 1, the ML system 110 includes a number of ML processing engines 111, 113, 115, each specializing in evaluating a particular aspect of the inputs 101. For example, Engine A 111 can be designed to specialize in facial expression recognition and analysis, Engine B 113 can be designed to specialize in gesture recognition and analysis, Engine C 115 can be designed to specialize in voice recognition and analysis. One or more trained ML engines that relate to the same aspect (e.g., facial recognition, gesture recognition, etc.) can be deployed together to produce an aspect-specific sub-score for the inputs. The sub-scores are then aggregated (e.g., using pre-configured weighting factors assigned to the sub-scores from various ML engines to generate a final weighted performance score) by the aggregator 117 to generate a final score indicating the grading of the performance. Using the modular design of the ML system 110, the various ML engines 111, 113 and 115 are decoupled from each other, allowing flexible section and configuration of a subset of available ML engines so as to achieve a customizable ML based on processing for evaluating acting performance.

In some embodiments, for a particular category or genre of acting performances, the system 100 can be designed to provide a template of the ML processing engines to process the inputs 101 of such performance to facilitate the generation of processed outputs for evaluating the performance. Table 1 shows an example template selection of ML engines for different categories of inputs (e.g., speech, drama acting, etc.). For example, performances that focus on speech are given higher weights to speech and articulation analysis and lower weights to facial/bodily motion analysis. Performances that are related to actions and body movements (e.g., dance, action) are given higher weights in the motion/movement analysis and lower weights in speech or facial analysis. Details about the ML engines (e.g., Articulation Analysis Engine, Facial Expressiveness Engine, Speech Rhythm Analysis Engine, Imitation Analysis Engine) are described below in connection with FIGS. 4-8.

TABLE 1

Example Template Section of ML engines for Different Categories of Inputs

| Input Category | ML engines | Weighting Factors |
| --- | --- | --- |
| Speech | Speech Recognition Engine | 0.2 |
|  | Articulation Analysis Engine | 0.3 |
|  | Facial Expressiveness Engine | 0.1 |
|  | Speech Rhythm Analysis Engine | 0.4 |
| Drama | Facial Expressiveness Engine | 0.2 |
|  | Gesture Recognition Engine | 0.2 |
|  | Facial Expression Transition Analysis Engine | 0.4 |
|  | Articulation Analysis Engine | 0.2 |
| Dance | Bodily Motion Transition Analysis Engine | 0.8 |
|  | Facial Expressiveness Engine | 0.2 |
| Action | Bodily Motion Transition Analysis Engine | 0.6 |
|  | Articulation Analysis Engine | 0.1 |
|  | Gesture Recognition Engine | 0.3 |

User Configuration Interface

To facilitate the flexible selection and configuration of the ML core, a user configuration interface 103 (e.g., a web interface) can be provided to the user. The user can be provided with a list of available engines for constructing a customized ML engine for the evaluation. Templates such as shown in Table 1 can also be provided to the user and allow the user to make further modifications to the customized evaluation system.

Depending on the nature or the category of a performance to be evaluated, the user can select appropriate ML engines and assign respective weights or weighting factors to the ML engines, respectively, or modify an existing template to build a customized ML engine for the automatic evaluation. For example, given a performance of public speech, the user can select one or more audio processing engines (e.g., a speech recognition engine, an articulation assessment engine, etc.) to evaluate the quality of the speech. In this specific example, only one facial recognition engine is needed to determine if the face of the presenter is recognizable during the speech. Greater weights can be assigned to the audio processing sub-scores and a smaller weight can be assigned to the facial recognition engine. As another example, for a drama performance, the user can select more engines for video analysis, such as a facial expression recognition engine and/or a gesture recognition engine, as compare to the number of engines needed for audio processing. Greater weights can be assigned to the video-processing sub-scores as compared to the sub-score(s) for the audio processing.

In some embodiments, the user can be prompted by the user interface 103 to provide additional input information, such as the textural description of the performance or a recording of the reference performance. The textual descriptions can preferably be a machine-readable script that includes description of the scene(s) and shot(s) of the performance.

System Outputs

As discussed above, the evaluation system 100 includes an aggregator 117 configured to generate a final score indicating the grading of the performance by aggregating sub-scores from different ML engines. The system 100 can also provide a textural description associated with the final score to summarize the overall acting performance. In addition to the final score, the system 100 can further output each of the sub-score in respective aspects and associated textural descriptions of the performance in each aspect.

In some embodiments, the outputs (e.g., the textural description, the final score, and sub-scores with corresponding descriptions) can be organized using a machine-readable script so that the evaluation results can be provided to the user or a final grader (e.g., via a user interface). For example, clips that are used as key indicator of the performances can be embedded or referenced in the script so that the user or the final grader can review the evaluation results by examining the key clips. Based on the outputs, the user or the final grader can incorporate subject grading criteria into the process by adjust the grading standard. The grading process can continue in an iterative manner to ensure that the evaluation results match the overall objective of the evaluation process.

Figure 2:
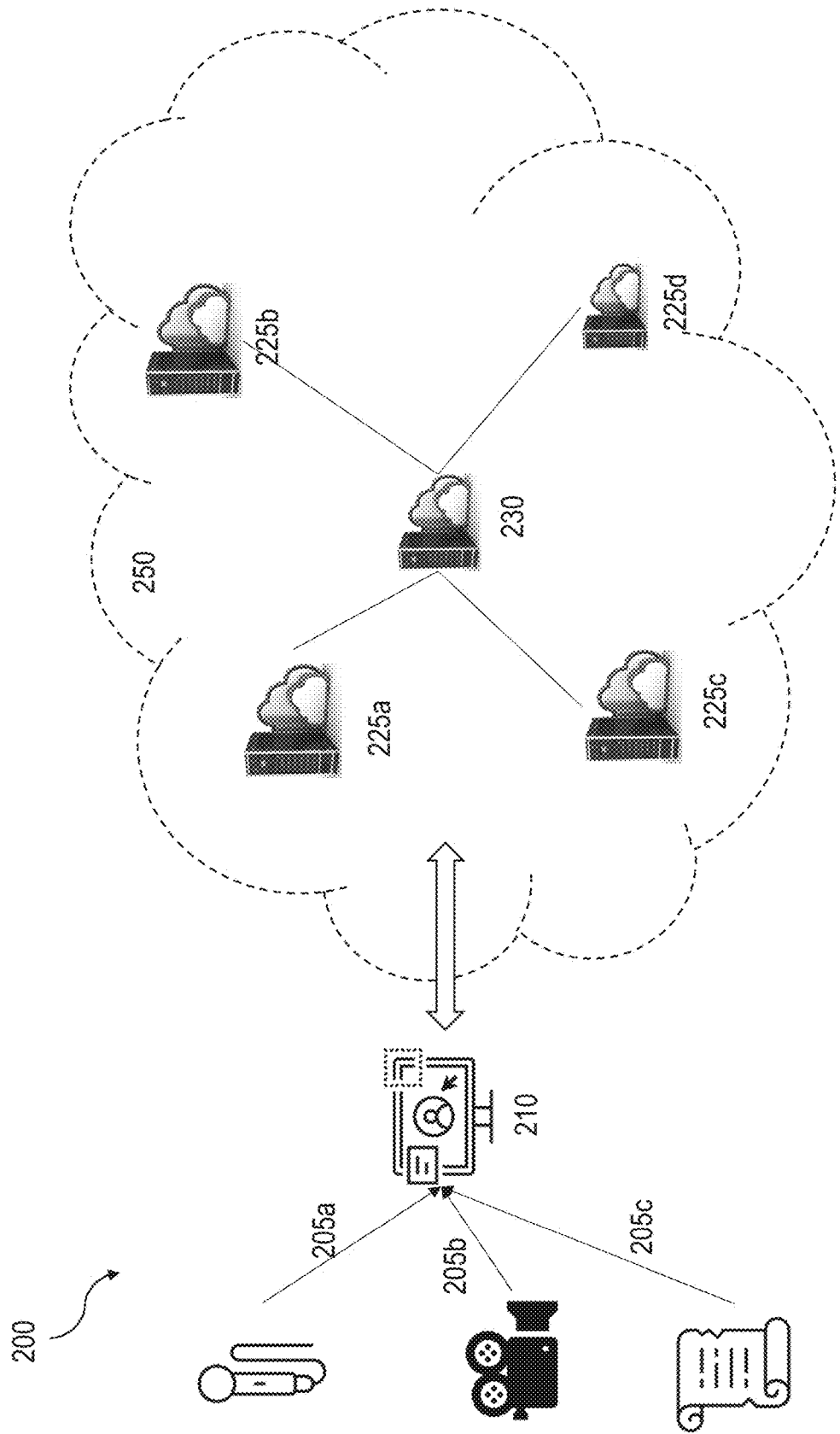
FIG. 2 illustrates an example architecture of an acting performance evaluation system in accordance with one or more embodiments of the present technology.

In some embodiments, the ML engines as part of the ML system 110 in FIG. 1 can be deployed in a distributed manner across different computer servers in communications and the performance evaluation by the automated acting performance evaluation system 100 can be provided as a cloud service. FIG. 2 illustrates an example architecture of an acting performance evaluation system 200 in accordance with one or more embodiments of the present technology. The user can provide various types of inputs (e.g., audio samples 205a, video samples 205b, textural descriptions of the acting performance 205c) to the evaluation system via a user interface 210. The user interface 210 is communication with the ML system 250 of the evaluation system via a communication or computer network. The ML system 250 includes one or more ML engines 225a-e that are distributed across the network as cloud services. In some embodiments, different ML engines are deployed on different servers. For example, ML engines that are related to audio processing of the content can be deployed onto the same server while ML engines that are related to gesture/bodily action processing of the content can be deployed onto another server. In some embodiments, each server can include different types of ML engines (e.g., audio as well as video processing) to allow a certain degree of redundancy across different servers in the cloud, thereby providing fallback protection in during the analysis and processing of the content. Since a system can be implemented in various configurations where computer servers or parts or components of the system can be geographically or physically located at different regions or locations to enable users to access the system and its service at any user location where there is an internet access. In operation, the system in FIG. 2 can allow for access by users via user devices or client devices such as a smartphone, a tablet, a laptop or desktop computer. A user can be located in one location while one or more of computer servers or parts or components of the system can be in a different region (e.g., in a foreign country in some system deployments).

Based on the nature of the performance, one or more ML engines (e.g., 225a, 225c-d), such as speech recognition, gesture, facial expression analysis engines, are selected to process the inputs. The inputs are transmitted to the selected ML engines for the engine-level processing to obtain sub-scores. The sub-scores are then aggregated and combined by the aggregator 230 to produce the final score. In the example shown in FIG. 2, the aggregator 230 is a server deployed separately from other engines. In some embodiments, the aggregator 230 can also be deployed as part of a ML engine. One or more ML engines can also be deployed in the same sever.

Figure 3:
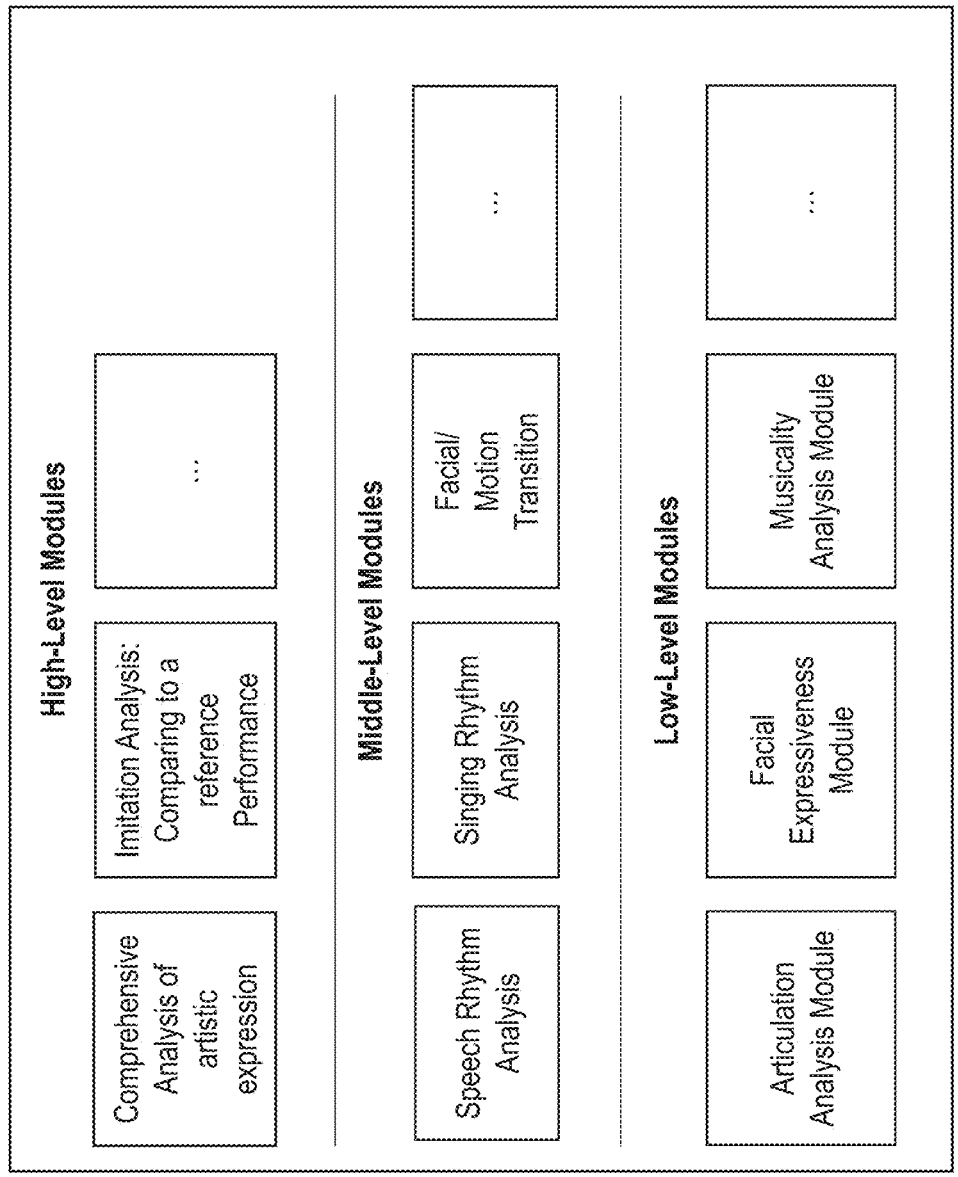
FIG. 3 illustrates an example organization of different engines in accordance with one or more embodiments of the present application.

In some embodiments, the engines are organized by the system based on complexity and comprehensiveness of the analysis performed by the engine, and users can select the appropriate engines based on the type of the input performances. FIG. 3 illustrates an example organization 300 of different engines in accordance with one or more embodiments of the present application. In some embodiments, engines that focus on basic analysis of the inputs can be organized as "low-level" engines. Such engines analyze the input for a very specific, and often objective grading task. In some embodiments, each of the low-level engines includes a single ML model. More complex analysis of the inputs, such as the rhythm of the action or continuity of the speech, can be organized as "middle-level" engines. Middle-level engines evaluate more sophisticated artistic capabilities and can incorporate some subjective criteria as compared to the low-level engines. Middle-level engines often includes multiple ML models to generate the evaluation score. Engines that perform analysis relating to the artistic aspects of the performance can be organized as "high-level" engines. The high-level engines include multiple sophisticated learning models to facilitate the evaluation of the performance given more subjective criteria. Depending on the nature of the performance to be evaluated, one or more levels of engines can be selected to construct a customized evaluation service (e.g., as shown in Table 1) to evaluate the input contents.

Some example low-level engines are described below.

1. Articulation Analysis Engine

Figure 4:
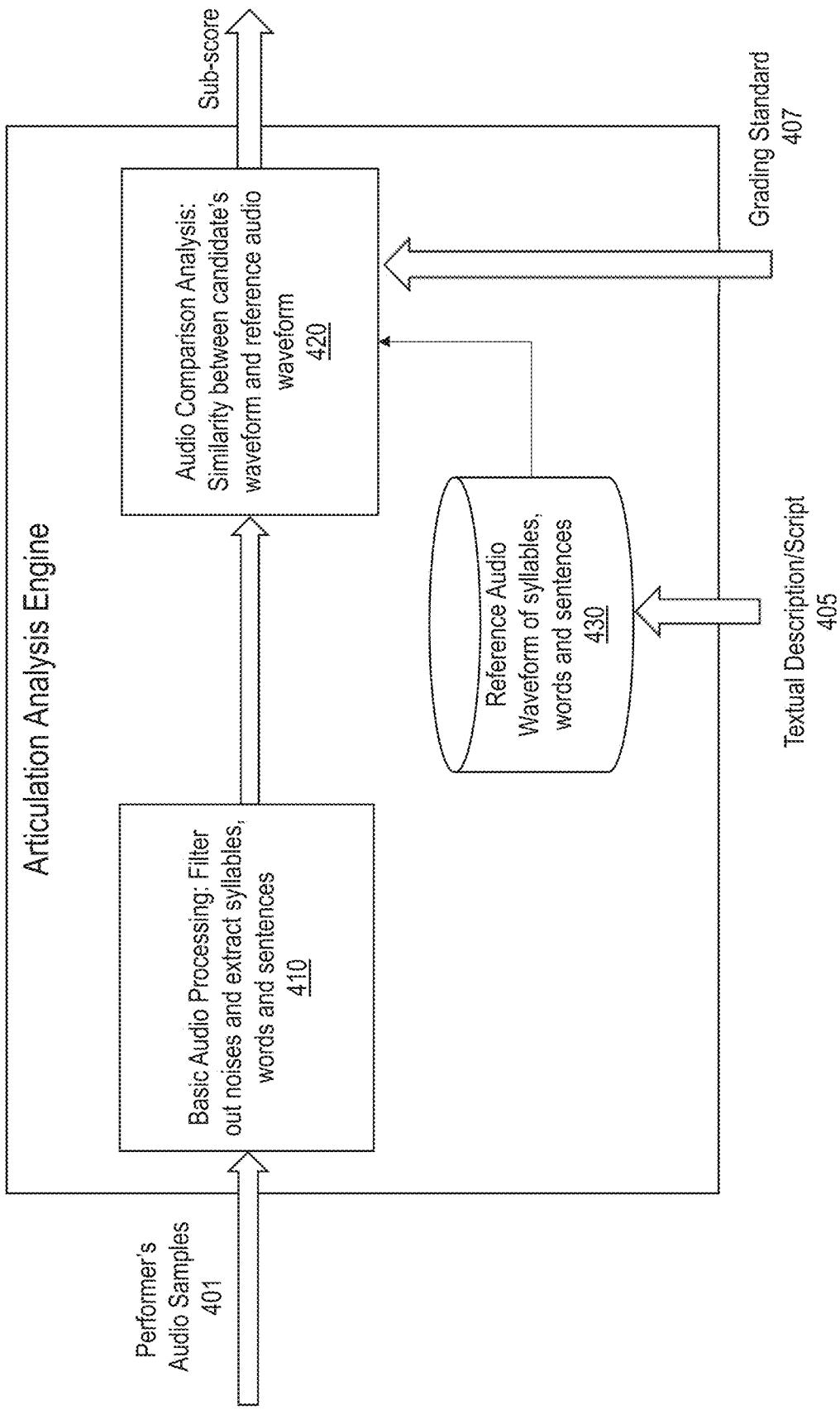
FIG. 4 is a schematic diagram of an example articulation analysis engine in accordance with one or more embodiments of the present technology.

Articulation refers to the ability to speak clearly and pronounce accurately. FIG. 4 is a schematic diagram of an example articulation analysis engine 400 in accordance with one or more embodiments of the present technology. The input for this engine includes the performer's audio samples 401. The articulation analysis engine 400 first performs basic audio processing 410 to filter out background noise, and to extract syllables, words, and sentences that are included in the audio samples. The extracted syllables, words, and sentences are converted in arrays of audio waveforms for the subsequence audio comparison analysis.

In some embodiments, based on the extracted syllables, words, and sentences, the articulation analysis engine queries a database 430 to retrieve the reference waveforms of the relevant syllables and words. In some embodiments, the articulation analysis engine further takes the textural description 405 of the acting performance as an input. The textural description can be a machine-readable script that includes the lines spoken in the audio samples and reference audio samples as inputs. The articulation analysis engine can query the database 430 to retrieve the reference waveforms of the relevant syllables and words based on the lines spoken. A comparison is then performed between the waveform of the performer's audio samples and retrieved reference waveforms based on a grading standard. The grading standard can be a default criterion associated with the type of the inputs (e.g., speech, drama, etc.) provided by the system template(s). The grading standard can also be specified by the user. For example, when the system is used to evaluate the performance in an iterative manner, the user can adjust the grading standard using subjective criteria. A sub-score for articulation analysis is then generated by the engine.

2. Facial Expressiveness Engine.

Figure 5:
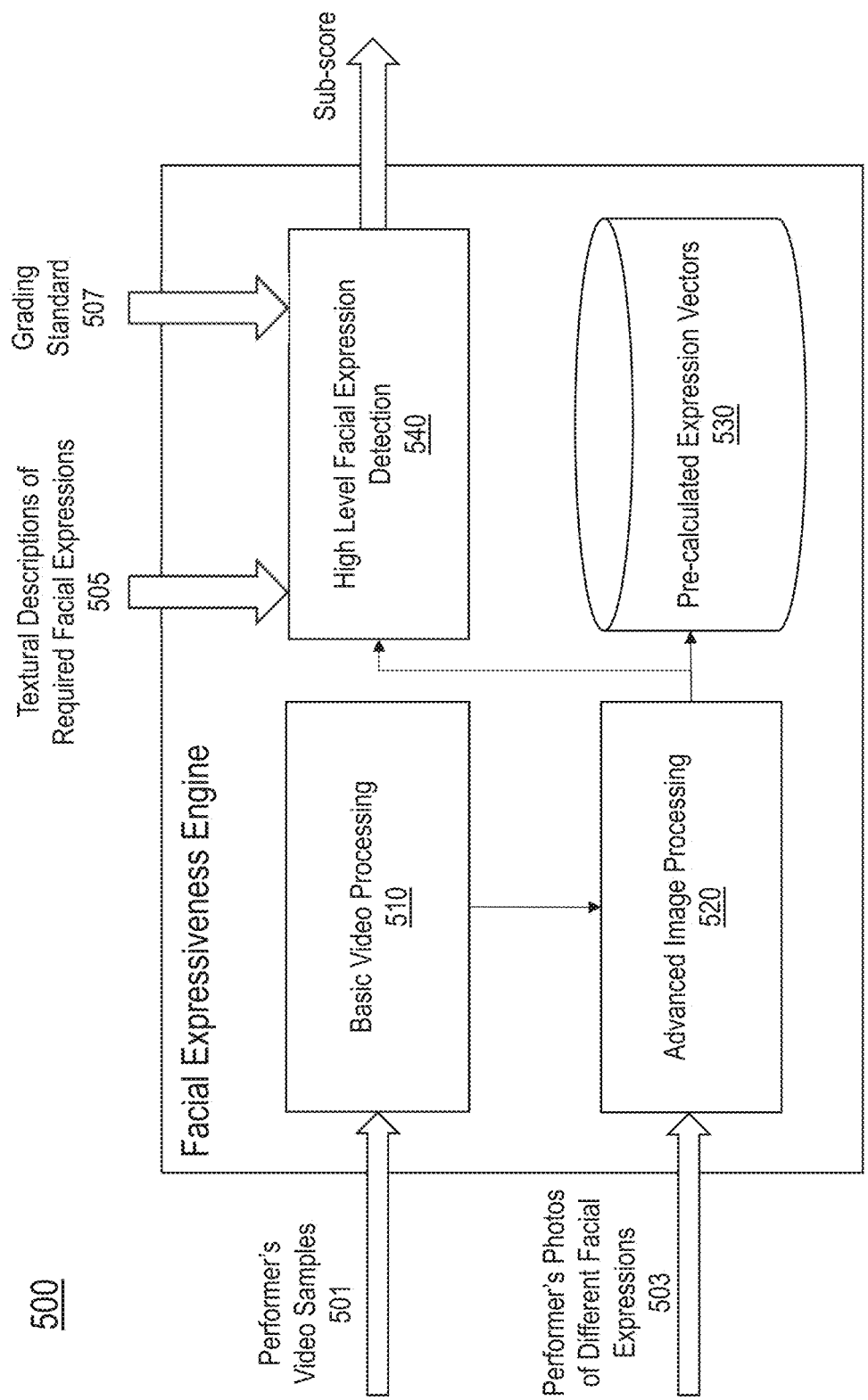
FIG. 5 is a schematic diagram of an example facial expressiveness engine in accordance with one or more embodiments of the present technology.

Facial expressiveness refers to the ability to display emotions with various facial expressions. FIG. 5 is a schematic diagram of an example facial expressiveness engine 500 in accordance with one or more embodiments of the present technology. The facial expressiveness engine 500 takes two inputs: the performer's video samples 501 and photos 503 showing different facial expressions taken at different angles.

The facial expressiveness engine 500 performs basic video processing on the input video samples to identify faces shown in the video samples. Bounding boxes can be given to mark the locations of the faces. The basic video processing can also include a scaling operation to scale the video samples to a standard size to facilitate subsequent processing of the samples.

The facial expressiveness engine 500 also includes one or more dimension reduction models (neural network, principal component analysis, etc.) as part of the advanced image processing unit 520 to build feature vectors for different facial expressions based on the performer's photos. These feature vectors can be stored as reference feature vectors in a database 530 for future evaluations of the same performer's video samples.

The detected faces and the extracted feature vectors are then used to evaluate the facial expressiveness of the performer in the input video samples. In some embodiments, the facial expressiveness engine further includes a facial expression detection unit 540 that takes the textural description 505 of the acting performance as an input. The textural description can be a machine-readable script that includes different facial expression tags describing the expressions that appear in the video samples. A sub-score for facial expressiveness is then generated based on the detected faces, the extracted feature vectors, and a grading standard. The grading standard can be a default criterion associated with the type of the inputs (e.g., speech, drama, etc.) provided by the system template(s). The grading standard can also be specified by the user, such as a standard that incorporates subjective grading criteria.

3. Musicality Analysis Engine

Figure 6:
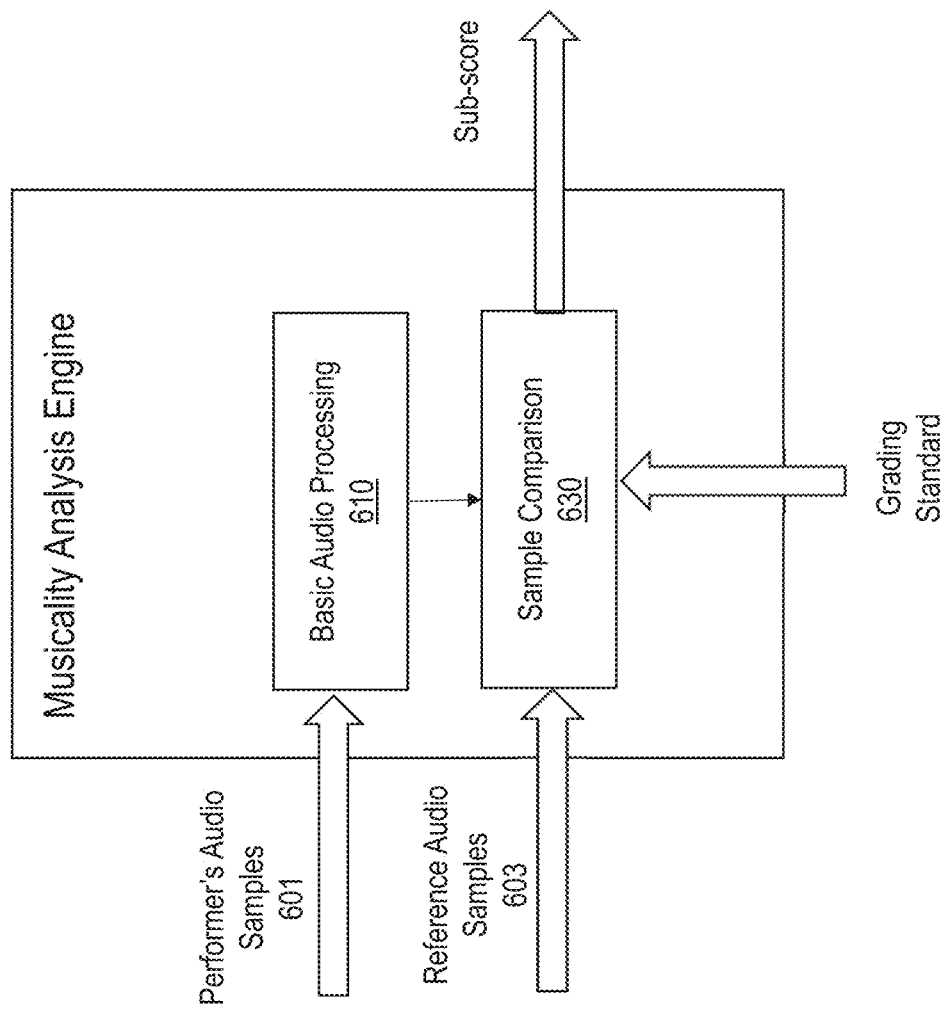
FIG. 6 is a schematic diagram of an example articulation analysis engine in accordance with one or more embodiments of the present technology.

Musicality refers to the ability to carry an accurate tune and have a good vocal range. The input for this engine includes the performer's audio samples (e.g., a recorded song). FIG. 6 is a schematic diagram of an example articulation analysis engine 600 in accordance with one or more embodiments of the present technology. The input for this engine includes the performer's audio samples 601. The engine 600 performs basic audio processing 610 to extract the notes that appear in the audio samples. Based on the extracted notes, the engine can query or identify a reference tune or reference audio samples that correspond to the audio samples. In some embodiments, the reference audio samples 603 are provided to the engine as inputs. A sub-score for musicality analysis is then generated by comparing the audio samples with the reference tune based on a grading standard. The grading standard can be a default criterion associated with the type of the inputs (e.g., speech, drama, etc.) provided by the system template(s). The grading standard can also be specified by the user so as to incorporate subjective grading criteria into the grading process.

Referring back to FIG. 3, middle-level engines evaluate more sophisticated artistic capabilities and can be more subjective as compared to the low-level engines. To enable automatic evaluation of the more subjective artistic capabilities of the performers, well-accepted acting references can be used to help grade the performer's acting performance.

Figure 7:
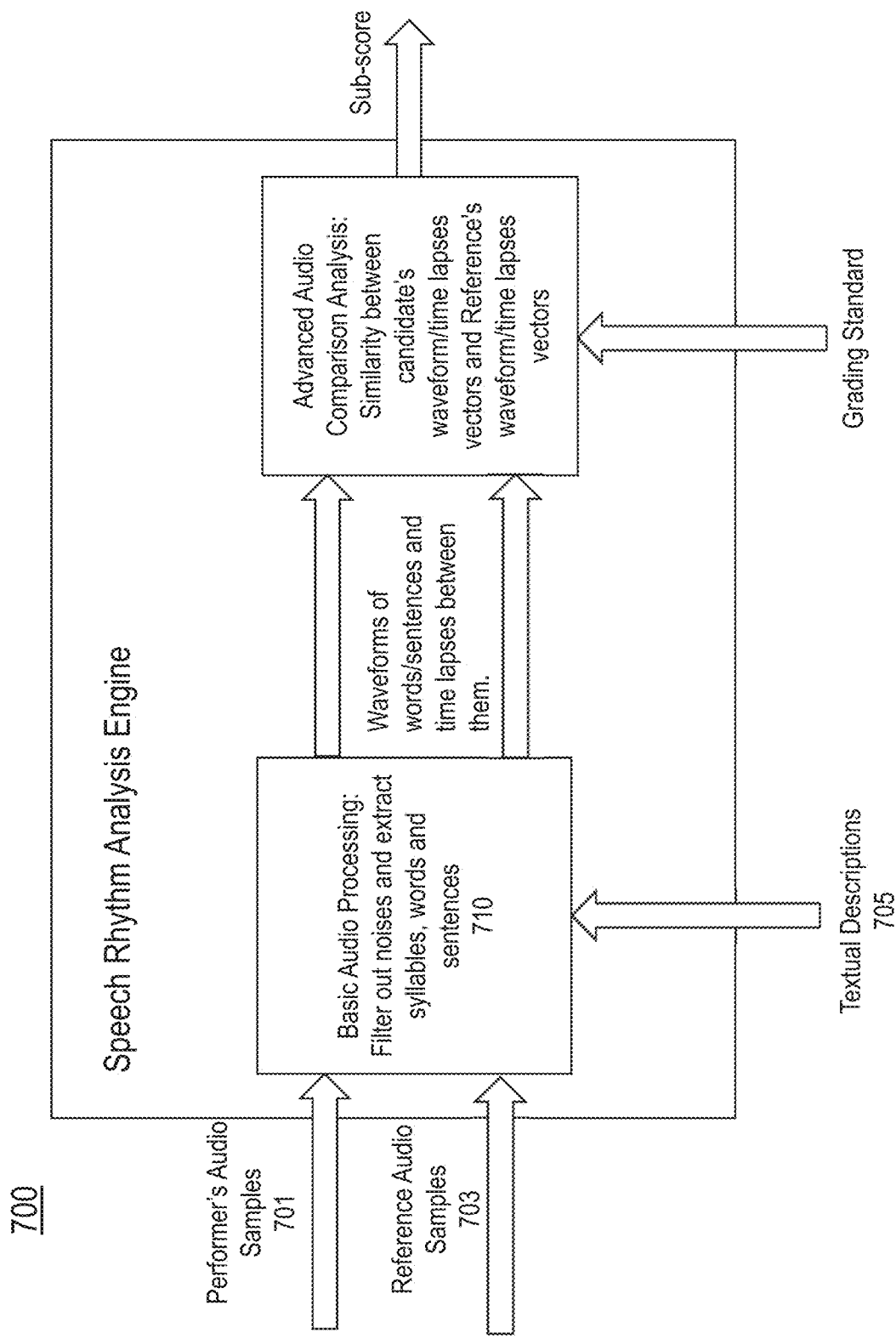
FIG. 7 is a schematic diagram of a middle-level speech rhythm analysis engine in accordance with one or more embodiments of the present technology.

Take speech rhythm analysis as an example, FIG. 7 is a schematic diagram of a middle-level speech rhythm analysis engine 700 in accordance with one or more embodiments of the present technology. The engine 700 takes two inputs: performer's audio samples of the speech 701 and reference audio samples of the same speech 703. The engine 700 performs basic audio processing 710 on both inputs to filter out noise and extract syllables, words, and sentences. Waveforms of the extracted syllables, words, and sentences are determined for inputs, along with the time lapse between the units of waveforms.

In some embodiments, the speech rhythm analysis engine 700 further takes the textural description 705 of the acting performance as an input. The textural description 705 can be a machine-readable script that includes the lines spoken in the audio samples and reference audio samples as inputs. The textural descriptions can be used to improve the accuracy of extracting the waveforms of audio units from the audio stream. The vectors of waveforms and the time lapses between any two consecutive units are then fed into the advanced audio comparison analysis to evaluate similarity between the performer's audio samples and the reference samples. A sub-score for speech rhythm is calculated based on both the similarity analysis and the grading standard. The grading standard can be a default criterion associated with the type of the inputs (e.g., speech, drama, etc.) provided by the system template(s). The grading standard can also be specified by the user. For example, when the system is used to evaluate the performance in an iterative manner, the user can adjust the grading standard using subjective criteria.

Referring back to FIG. 3, ML engines that perform analyses relating to the artistic aspects of the performance can be organized as "high-level" engines. For example, analyses performed to determine the level of imitation between the candidate performance and the reference performance can be considered as a "high-level" analysis. High level engines often involve multiple aspects (speech, singing, facial expression, body motion, and/or gesture). They are highly complex involving multiple media analysis depending on the specific artistic objectives.

Figure 8:
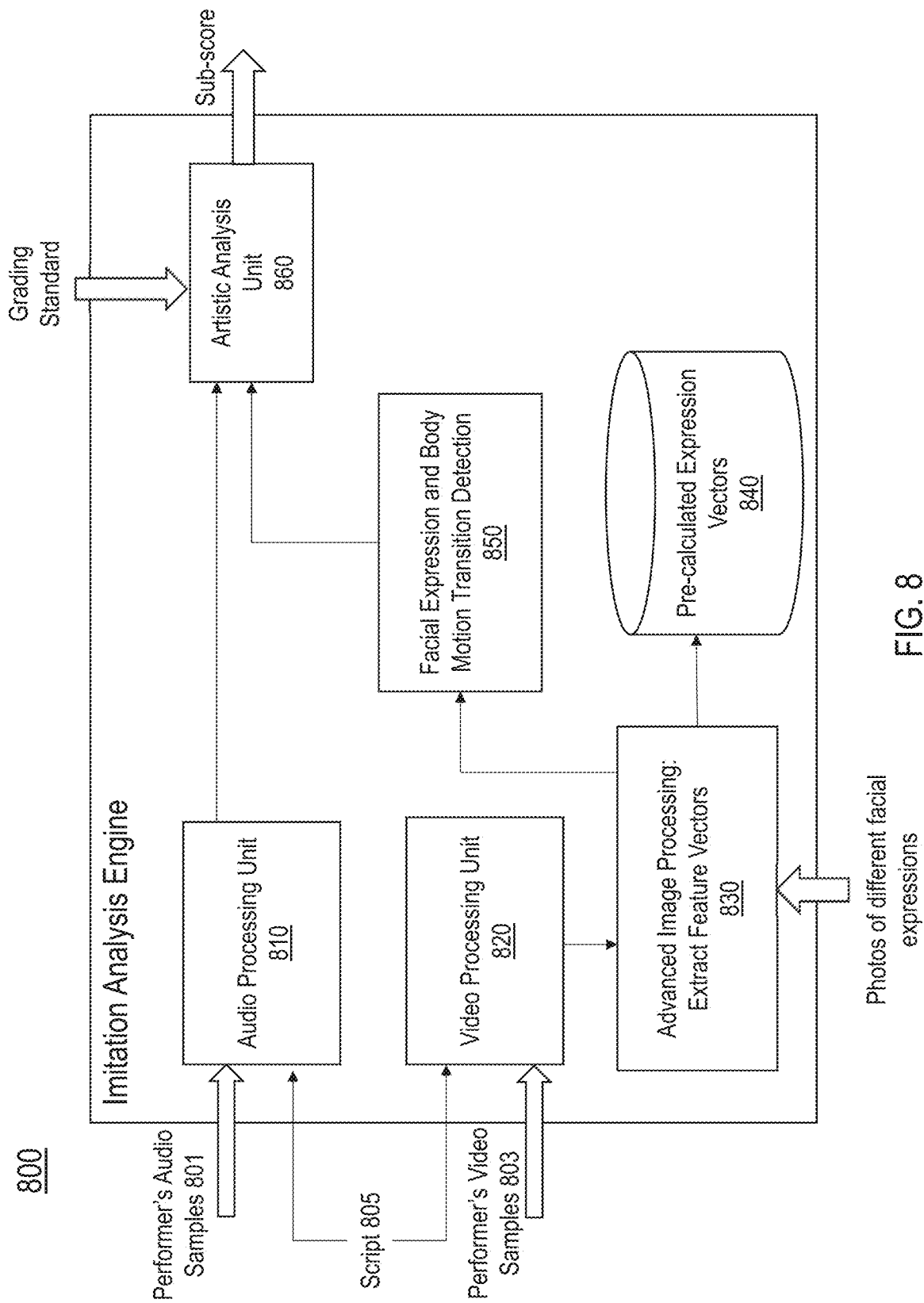
FIG. 8 is a schematic diagram of a high-level imitation analysis engine in accordance with one or more embodiments of the present technology.

For example, as part of the evaluation process, the performer can be asked to play a scene selected from one of Shakespeare pieces that are often used for auditions. The objective of the evaluation is to determine whether the performance of the performer is consistent with what is the defined in the script. FIG. 8 is a schematic diagram of a high-level imitation analysis engine 800 in accordance with one or more embodiments of the present technology. The imitation analysis engine 800 loads the audio samples 801 and video samples 803 of the performance as well as the script 805. The audio processing unit 810 converts the audio to text and match them to the "line" tag in the script. The video processing unit 820 detects the facial and body motions in the video samples and match them to the facial expression and/or gesture items in the script. For example, the video processing unit 820 can extract the bounding boxes of the detected faces or body motions, and scale each of the boxes to a standard size to facilitate subsequent processing. The scaled bounding boxes can be sent to an advanced image processing unit 830 to extract feature vectors.

In some embodiments, the advanced image processing unit 830 includes one or more dimension reduction models (neural network, principal component analysis (PCA), non-negative matrix factorization, linear discriminant analysis, generalized discriminant analysis, canonical correlation analysis, autoencoders, etc.) to build feature vectors for different facial expressions based on the performer's photos. Dimension reduction is the transformation of high-dimensional data (e.g., video or audio data that includes a large number of samples) into a low-dimensional space (e.g., selected number of video or audio features). These feature vectors can be stored as reference feature vectors in a database 840 for future evaluations of the same performer's video samples. The extracted feature vectors are then sent to a facial expression and body motion transition detection unit 850 that is configured to match the extracted feature vectors with the reference feature vectors stored in the database 840, and to align the detected transitions with the relevant tags in the script.

The output from the audio processing unit 810 and the facial expression and body motion transition detection engine 850 are then fed into an artistic analysis unit 860. The artistic analysis unit 860 examines the alignment of the spoken syllables/words and the script, as well as the alignment of the facial expressions/body actions with the script. The artistic analysis unit 860 then generates a sub-score indicating a degree of imitation level as compared to the reference sample(s) based on a grading standard. The grading standard can be a default criterion associated with the type of the inputs (e.g., speech, drama, etc.) provided by the system template(s). The grading standard can also be specified by the user. For "high-level" engines, the evaluation of the performance often involves more subjective criteria as compared to "low-level" engine that focuses on specific aspects of the content. Therefore, the artistic analysis unit 860 can provide preliminary analysis results to the user and allow the user to adjust the grading standard to incorporate subject criteria in the process. Once the user is content with the output of this module, the sub-score can be aggregated with outputs of the other modules to produce a final evaluation.

Figure 9:
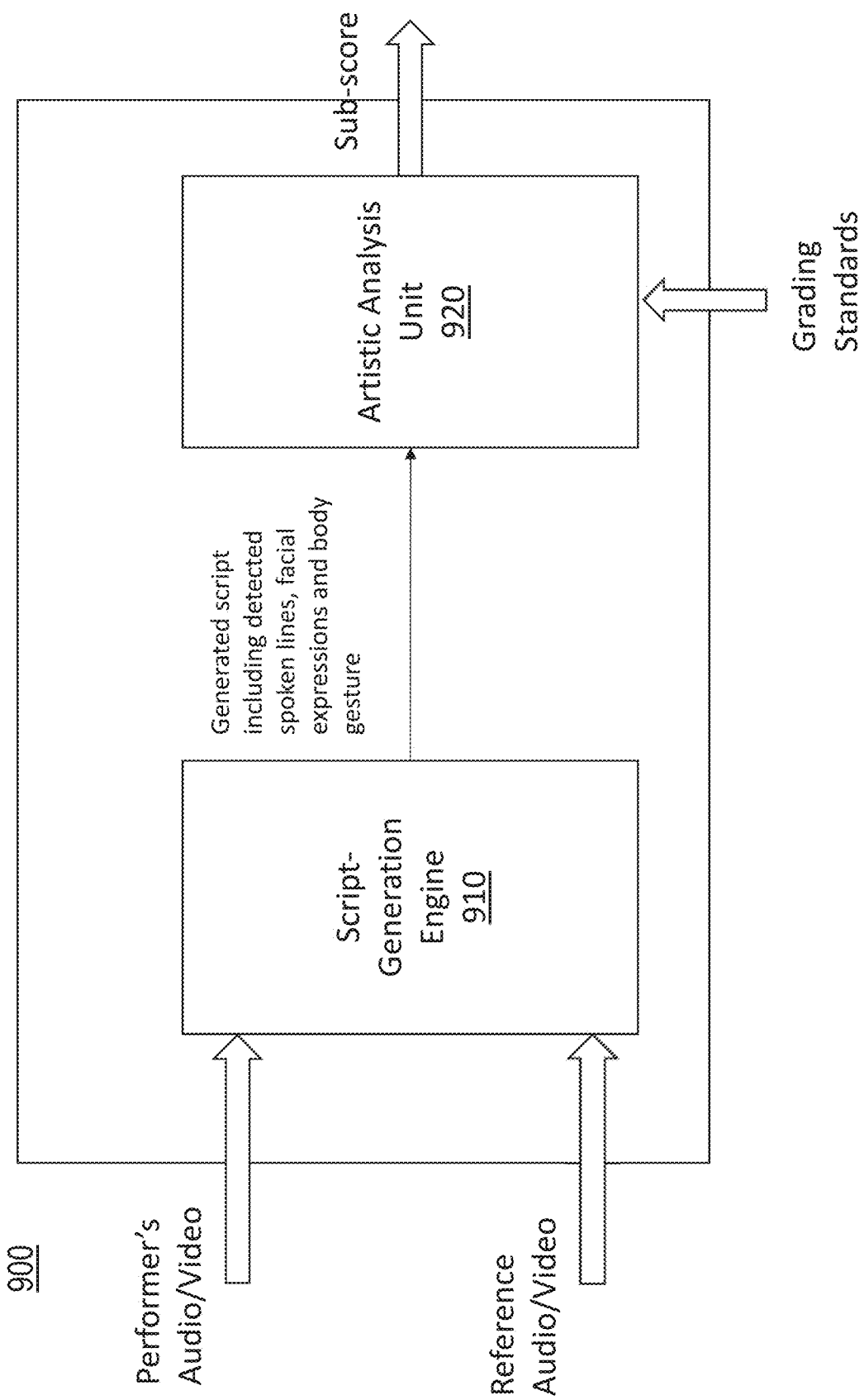
FIG. 9 is a schematic diagram of another high-level analysis engine 800 in accordance with one or more embodiments of the present technology.

FIG. 9 is a schematic diagram of another high-level analysis engine 800 in accordance with one or more embodiments of the present technology. This engine includes a sophisticated script generation engine that can extract various features from the reference audio/video data and generate a script based on the extracted features. For example, the engine can convert the audio data to texts that indicating the lines spoken in the scene. Each line is given a timestamp based on the reference audio/video data. Similarly, the engine can detect facial and body motions using the reference video data. The engine can extract bounding boxes of the detected faces or body motions, and record metadata information about the bounding boxes (e.g., timestamps for the detected bounding boxes, textural descriptions about the detected facial expressions/motion) in the script. Table 2 shows a machine-readable script that describes the various elements in a scene generated according to one or more embodiments of the present technology. The items in the script are arranged according to a timeline. When there are multiple persons in a scene, multiple sets of audio/video data captured by several devices can be provided to the engine to produce a structured script as a reference for artistic analysis. Further details about the machine readable script are described in U.S. Pat. No. 11,107,503, filed on Jul. 10, 2020, the entire disclosure of which is incorporated by reference as part of the disclosure of this document.

TABLE 2

Example Script of a Selected Scene

```
<scene id=5, name="Capulet's orchard">
   <stage>Enter ROMEO and JULIET above, at the window</stage>
   <line role="Juliet">
      Wilt thou be gone? it is not yet near day: It was the nightingale,
and not the lark...
      <timestamp>00:00:29</timestamp>
   </line>
   <facial_expression_transition role="Juliet">
      <from>calm</from>
      <to>sad</to>
      <timestamp>00:01:06</timestamp>
   </facial_expression_transition>
   <facial_expression_transition role="Romeo">
      <from>calm</from>
      <to>cry</to>
      <timestamp>00:01:12</timestamp>
   </facial_expression_transition>
   <line role="Romeo">
      Let me be ta'en, let me be put to death; I am content, so thou wilt
have it so...
      <timestamp>00:01:29</timestamp>
   </line>
   <gesture role="Romeo">
         standing up
      <timestamp>00:02:12</timestamp>
   </gesture>
</scene>
```

The engine is also configured to extract the features from the performer's audio and video data and transmit such data to the artistic analysis unit 920. The artistic analysis unit 920 examines the alignment of the syllables/words spoken by the performer and the items defined the generated script, as well as the alignment of the facial expressions/body actions with the items in the script. The artistic analysis unit 860 then generates a sub-score indicating a degree of imitation level as compared to the reference sample(s) based on a grading standard. The grading standard can be a default criterion associated with the type of the inputs (e.g., speech, drama, etc.) provided by the system template(s). Similar to the example shown in FIG. 8, for "high-level" engines, the evaluation of the performance often involves more subjective criteria. The artistic analysis unit 920 can provide preliminary analysis results to the user and allow the user to adjust the grading standard so as to incorporate subject criteria in the process. Once the user is content with the output of this module, the sub-score can be aggregated with outputs of the other modules to produce a final evaluation.

Figure 10:
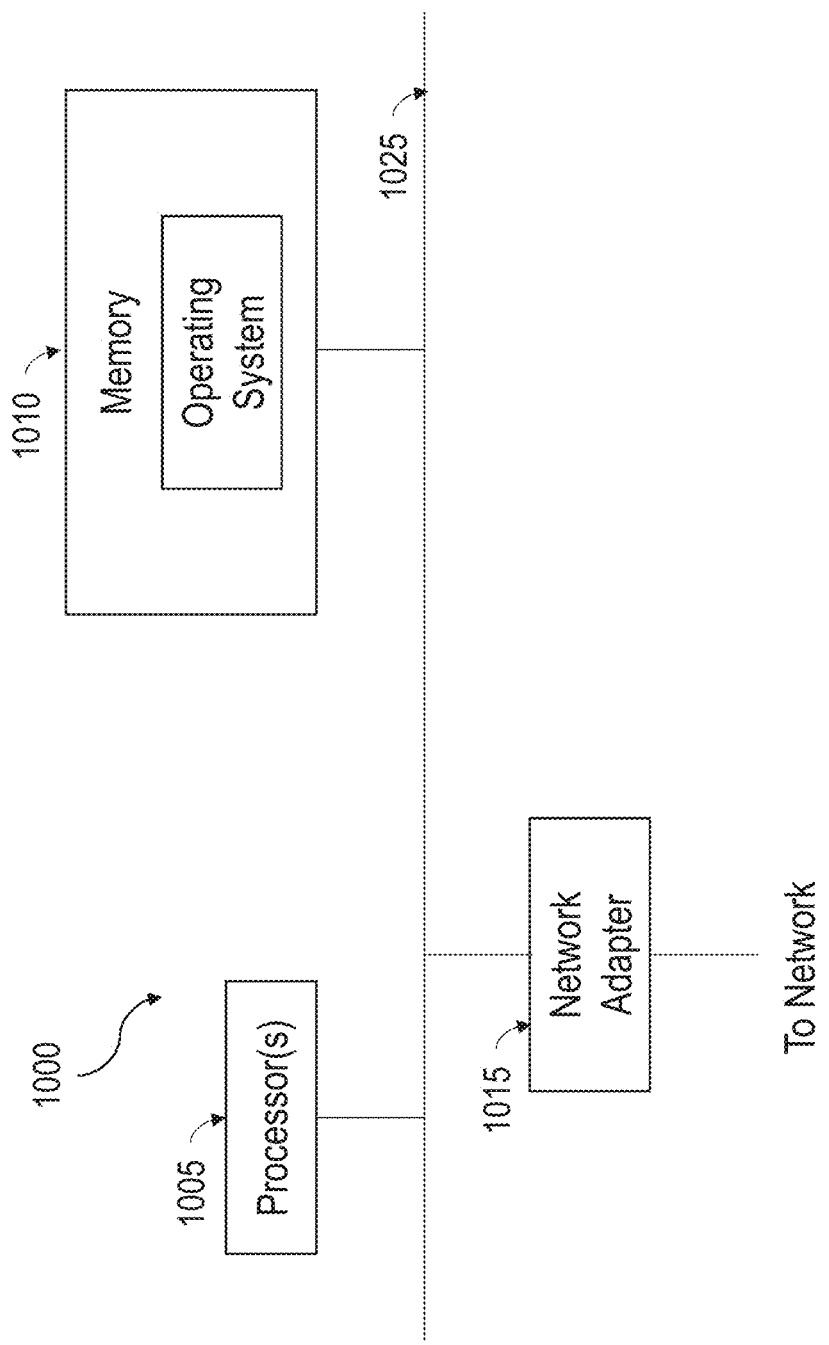
FIG. 10 is a block diagram illustrating an example of the architecture for a computer system or other control device that can be utilized to implement various portions of the presently disclosed technology.

FIG. 10 is a block diagram illustrating an example of the architecture for a computer system or other control device 1000 that can be utilized to implement various portions of the presently disclosed technology (e.g., one or more ML engines). The computer system 1000 includes one or more processors 1005 and memory 1010 connected via an interconnect 1025. The interconnect 1025 may represent any one or more separate physical buses, point to point connections, or both, connected by appropriate bridges, adapters, or controllers. The interconnect 1025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1005 may include central processing units (CPUs) to control the overall operation of, for example, the host computer. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1010 can be or include the main memory of the computer system. The memory 1010 represents any suitable form of random access memory (RAM), read-only memory (ROM), flash memory, or the like, or a combination of such devices. In use, the memory 1010 may contain, among other things, a set of machine instructions which, when executed by processor 1005, causes the processor 1005 to perform operations to implement embodiments of the presently disclosed technology.

Also connected to the processor(s) 1005 through the interconnect 1025 is a (optional) network adapter 1015. The network adapter 1015 provides the computer system 1000 with the ability to communicate with remote devices, such as the storage clients, and/or other storage servers, and may be, for example, an Ethernet adapter or Fiber Channel adapter.

Figure 11:
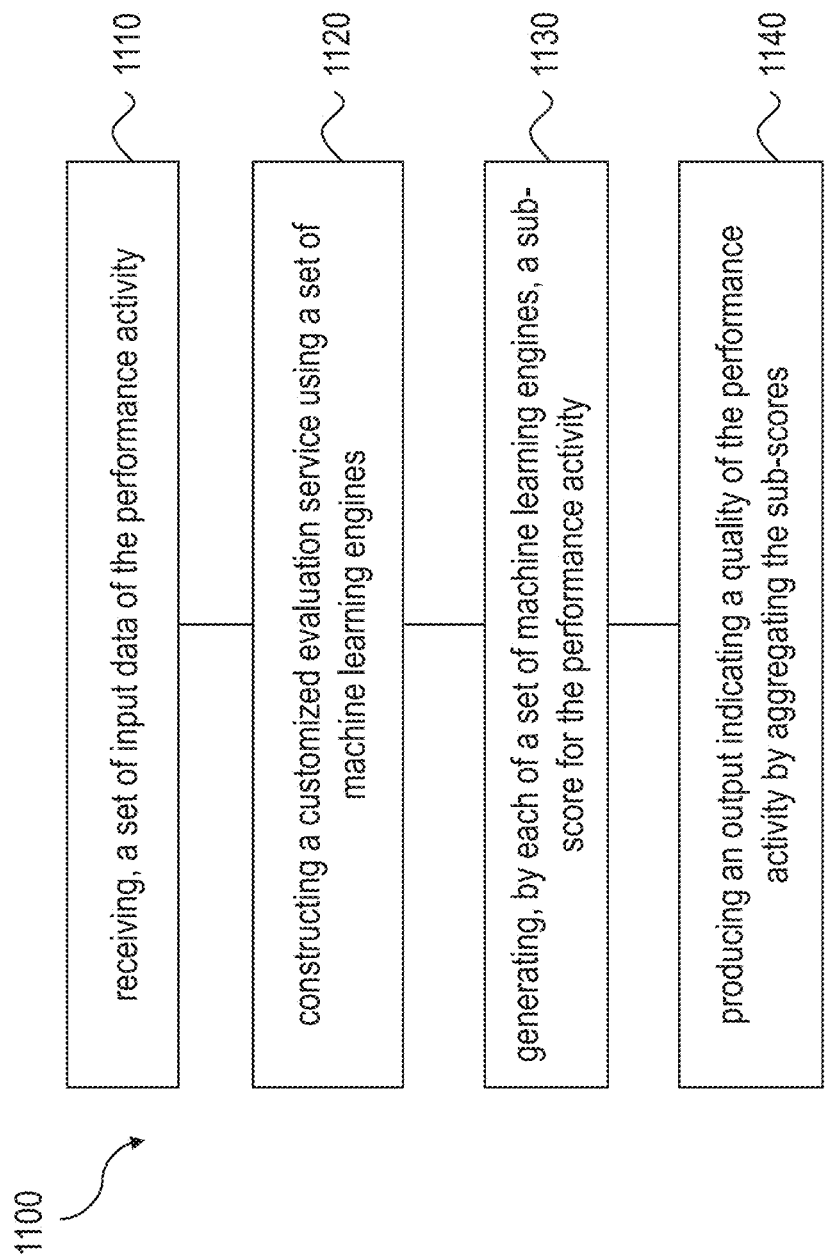
FIG. 11 is a flowchart representation of a method for automatically evaluating a performance activity performed by a performer in accordance with one or more embodiments of the present technology.

FIG. 11 is a flowchart representation of a method 1100 for automatically evaluating a performance activity performed by a performer in accordance with one or more embodiments of the present technology. The method 1100 includes, at operation 1110, receiving, via a user interface, a set of input data of the performance activity. The set of input data comprises at least video performance data or audio performance data. The method 1100 includes, at operation 1120, constructing a customized evaluation service using a set of machine learning engines selected from one or more available machine learning engines. The one or more available machine learning engines are organized into different levels according to a processing complexity associated with each machine learning engine. The method 1100 includes, at operation 1130, generating, by each of a set of machine learning engines, a sub-score for the performance activity. The method 1100 includes, at operation 1140, producing an output indicating a quality of the performance activity by aggregating the sub-scores generated by the subset of the one or more available machine learning engines.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more engines of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses various apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a engine, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more engines, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include various forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that various illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for providing an automated evaluation of performance activities, comprising:
    a user interface configured receive a set of input data of a performance activity performed by a performer, the set of input data comprising at least video performance data or audio performance data,
    one or more machine learning engines in communication with the user interface,
        wherein the one or more machine learning engines are selected from a set of available machine learning engines based on one or more characteristics of the performance,
        wherein each machine learning engine is configured to generate a sub-score of the performance activity in a specific area of the performance activity using the set of input data received from the user interface; and
    an aggregator in communication with the one or more machine learning engines, wherein the aggregator is configured to:
        receive sub-scores generated by the one or more available machine learning engines,
        assign weighting factors to the sub-scores, respectively, based on the one or more characteristics of the performance, and
        aggregate the sub-scores using the weighting factors to produce an output indicating a quality of the performance activity.

2. The system of claim 1, wherein the user interface is configured to provide a template of machine learning engines based on the one or more characteristics of the performance activity.

3. The system of claim 1, wherein the set of input data further comprises a textural description of the performance activity, and wherein the textural description comprises a machine-readable script including lines or actions associated with the performance activity.

4. The system of claim 1, wherein the set of input data further comprises audio and/or video data representing a reference activity corresponding to the performance activity.

5. The system of claim 4, wherein at least one of the one or more available machine learning engines is configured to evaluate a degree of a similarity between the performance activity and the reference activity.

6. The system of claim 4, wherein at least one of the one or more available machine learning engines is configured to generate a machine-readable script based on the audio and/or video data of the reference activity, wherein the machine-readable script includes at least one or more lines spoken and/or one or more actions performed in the reference activity, each of the one or more lines or the one or more actions is associated with a timestamp included in the machine-readable script.

7. The system of claim 1, wherein the output comprises at least one of: (1) a final score generated based on a weighted combination of the sub-scores using the weighting factors, (2) a textural description of the quality of the performance activity, (3) the sub-scores generated by the one or more machine learning engines, or (4) a textural description for each of the sub-scores.

8. The system of claim 1, wherein the one or more machine learning engines are deployed in a distributed manner across a network.

9. The system of claim 1, wherein the one or more machine learning engines are organized into different levels according to a processing complexity associated with each machine learning engine.

10. The system of claim 1, wherein the set of input data further comprises photographs of the performer taken from different angles, wherein the photographs include multiple facial expressions of the performer, wherein at least one of the one or more available machine learning engines is configured to extract feature vectors from the photographs as reference expressions, and wherein the system further comprises a database configured to store the reference expressions of the performer for subsequent processing.

11. A non-transitory computer program product having code stored thereon, the code, when executed by one or more processors in communication with each other via a network, causing the one or more processors to:
receive a set of input data of a performance activity performed by a performer,
wherein the set of input data comprises at least video performance data or audio performance data,
determine one or more characteristics of the performance activity based on the at least video performance data or audio performance data,
build a customized evaluation service using a set of machine learning engines selected from one or more machine learning engines available in an evaluation system of performance activities,
wherein the set of machine learning engines is selected based on the one or more characteristics of the performance activity,
determine, by each of a set of machine learning engines, a sub-score for the performance activity, and
generate an output indicating a quality of the performance activity by aggregate sub-scores determined by the set of machine learning engines.

12. The non-transitory computer program product of claim 11, wherein the set of machine learning engines is selected according to a template stored as part of the non-transitory computer program product.

13. The non-transitory computer program product of claim 11, wherein the set of input data further comprises a textural description of the performance activity, and wherein the textural description comprises a machine-readable script that includes lines or actions associated with the performance activity.

14. The non-transitory computer program product of claim 11, wherein the set of input data further comprises audio and/or video data representing a reference activity corresponding to the performance activity.

15. The non-transitory computer program product of claim 14, wherein the code, when executed by one or more processors in communication with each other via a network, further causes the one or more processors to:
evaluate, using at least one of the set of machine learning engines, a degree of similarity between the performance activity and the reference activity.

16. The non-transitory computer program product of claim 14, wherein the code, when executed by one or more processors in communication with each other via a network, further causes the one or more processors to:
generate, using at least one of the set of machine learning engines, a machine-readable script based on the audio and/or video data of the reference activity, wherein the machine-readable script includes at least one or more lines spoken and/or one or more actions performed during the reference activity, each of the one or more lines or the one or more actions is associated with a timestamp included in the machine-readable script.

17. The non-transitory computer program product of claim 11, wherein the output comprises at least one of: (1) a final score generated based on a weighted combination of the sub-scores using the weighting factors, (2) a textural description of the quality of the performance activity, (3) the sub-scores generated by the one or more machine learning engines, or (4) a textural description for each of the sub-scores.

18. The non-transitory computer program product of claim 11, wherein the code, when executed by one or more processors in communication with each other via a network, further causes the one or more processors to:
receive multiple photographs of the performer taken from different angles, wherein the multiple photographs include multiple facial expressions of the performer,
extract feature vectors of the performer using at least one of the set of machine learning engines, and
store the extracted feature vectors as reference expressions of the performer in a database.

19. The non-transitory computer program product of claim 11, wherein the code, when executed by one or more processors in communication with each other via a network, further causes the one or more processors to:
detect, using at least one of the set of machine learning engines, one or more faces in the video performance data of the performance activity;
identify one or more feature vectors associated with a facial expression based on the detected one or more faces,
receive one or more reference feature vectors associated with multiple facial expressions of the performer from a database, and
determine the facial expression by comparing the one or more feature vectors with the one or more reference feature vectors.

20. The non-transitory computer program product of claim 11, wherein the code, when executed by one or more processors in communication with each other via a network, further causes the one or more processors to:
perform, using at least one of the set of machine learning engines, noise filtering on the audio data of the performance activity,
extract at least a syllable, a word, or a sentence from the filtered audio data; and
convert the extracted syllable, word, or sentence into a waveform.

21. A method for automatically evaluating a performance activity performed by a performer, comprising:
receiving, via a user interface, a set of input data of the performance activity,
wherein the set of input data comprises at least video performance data or audio performance data, wherein part of the at least video performance data or audio performance data represents a reference activity corresponding to the performance activity;

constructing a customized evaluation service using a set of machine learning engines selected from one or more available machine learning engines,
wherein the set of machine learning engines is selected based on one or more characteristics of the performance activity, and
wherein the constructing comprises:
generating, using at least one of the set of machine learning engines, a machine-readable script based on the audio and/or video data of the reference activity, wherein the machine-readable script includes at least one or more lines spoken and/or one or more actions performed during the reference activity, each of the one or more lines or the one or more actions is associated with a timestamp included in the machine-readable script; and producing an output indicating a quality of the performance activity by comparing the performance activity with the reference activity using the machine-readable script.

22. The method of claim 21, wherein the one or more available machine learning engines are organized into different levels according to a processing complexity associated with each machine learning engine.

23. The method of claim 21, further comprising:
determining a template of the customized evaluation service based on characteristics of the performance activity.

24. The method of claim 21, wherein producing the output comprises:
generating, by each of a subset of the set of machine learning engines, a sub-score of the performance activity in a specific area of the performance activity using the set of input data; and
aggregating the sub-scores using different weighting factors to produce the output.

25. The method of claim 24, wherein the output comprises at least one of: (1) a final score generated based on a weighted combination of the sub-scores, (2) a textural description of the quality of the performance activity, (3) the sub-scores generated by the subset of the one or more available machine learning engines, or (4) a textural description for each of the sub-scores.

26. The method of claim 21, further comprising:
receiving multiple photographs of the performer taken from different angles, wherein the multiple photographs include multiple facial expressions of the performer,
extracting feature vectors of the performer using at least one of the set of machine learning engines, and
storing the extracted feature vectors as reference facial expressions of the performer in a database.

27. The method of claim 21, further comprising:
detecting, using at least one of the set of machine learning engines, one or more faces in the video performance data of the performance activity;
identifying one or more feature vectors associated with a facial expression based on the detected one or more faces,
receiving one or more reference feature vectors associated with multiple facial expressions of the performer from a database, and
determining the facial expression by comparing the one or more feature vectors with the one or more reference feature vectors.

28. The method of claim 21, further comprising:
performing, using at least one of the set of machine learning engines, noise filtering on the audio data of the performance activity,
extracting at least a syllable, a word, or a sentence from the filtered audio data; and
converting the extracted syllable, word, or sentence into a waveform.

* * * * *